(12) United States Patent
Subramanian et al.

(10) Patent No.: US 11,359,646 B2
(45) Date of Patent: Jun. 14, 2022

(54) GAS TURBINE ENGINE WITH VANE HAVING A COOLING INLET

(71) Applicant: General Electric Company, Schenectady, NY (US)

(72) Inventors: Sesha Subramanian, Bangalore (IN); Monty Lee Shelton, Loveland, OH (US); Robert Proctor, Mason, OH (US); Mohamed Musthafa Thoppil, Bangalore (IN); Venkateswararao Gurram, Bangalore (IN); Josiah Warren Joiner, Cincinnati, OH (US); Wojciech Sak, West Chester, OH (US)

(73) Assignee: General Electric Company, Schenectady, NY (US)

( * ) Notice: Subject to any disclaimer, the term of this patent is extended or adjusted under 35 U.S.C. 154(b) by 276 days.

(21) Appl. No.: 16/555,558

(22) Filed: Aug. 29, 2019

(65) Prior Publication Data

US 2020/0011347 A1 Jan. 9, 2020

Related U.S. Application Data

(63) Continuation of application No. 14/941,995, filed on Nov. 16, 2015, now Pat. No. 10,451,084.

(51) Int. Cl.
*F04D 29/58* (2006.01)
*F04D 29/54* (2006.01)
(Continued)

(52) U.S. Cl.
CPC ........... *F04D 29/582* (2013.01); *F01D 5/187* (2013.01); *F01D 9/041* (2013.01); *F01D 11/001* (2013.01);
(Continued)

(58) Field of Classification Search
CPC ..................................................... F04D 29/682
See application file for complete search history.

(56) References Cited

U.S. PATENT DOCUMENTS 2,720,356 A * 10/1955 Erwin ................... F04D 29/682
415/115
2,830,754 A * 4/1958 Stalker ................... F04D 19/028
415/181

(Continued)

FOREIGN PATENT DOCUMENTS

CN 101178029 5/2008
CN 101196125 6/2008
(Continued)

OTHER PUBLICATIONS

Chinese Patent Office, "First Office Action and Search Report," issued in connection with corresponding CN Application No. 201611007388.3, dated Jun. 22, 2018, 13 pages.

(Continued)

*Primary Examiner* — Kayla McCaffrey
(74) *Attorney, Agent, or Firm* — Hanley, Flight & Zimmerman, LLC

(57) ABSTRACT

An apparatus and method of cooling a hot portion of a gas turbine engine, such as a multi-stage compressor of a gas turbine engine, by reducing an operating air temperature in a space between a seal and a blade post of adjacent stages by routing cooling air through an inlet in the vane, passing the routed cooling air through the vane, and emitting the routed cooling air into the space.

19 Claims, 5 Drawing Sheets

(51) Int. Cl.
*F01D 11/00* (2006.01)
*F01D 5/18* (2006.01)
*F01D 9/04* (2006.01)
*F04D 29/08* (2006.01)
*F04D 29/32* (2006.01)

(52) U.S. Cl.
CPC ......... *F04D 29/083* (2013.01); *F04D 29/321* (2013.01); *F04D 29/542* (2013.01); *F04D 29/584* (2013.01); *F05D 2220/3216* (2013.01); *F05D 2240/81* (2013.01); *Y02T 50/60* (2013.01)

(56) References Cited

U.S. PATENT DOCUMENTS

| | | | |
|---|---|---|---|
| 3,291,447 A * | 12/1966 | Brandon | F01D 5/18 415/111 |
| 3,694,102 A * | 9/1972 | Conrad | F04D 29/682 415/115 |
| 4,113,406 A * | 9/1978 | Lee | F01D 11/001 415/115 |
| 4,534,701 A | 8/1985 | Wisser | |
| 5,480,284 A * | 1/1996 | Wadia | F01D 25/32 416/91 |
| 5,494,402 A * | 2/1996 | Glezer | F01D 9/02 415/115 |
| 6,109,867 A * | 8/2000 | Jacques Portefaix | F01D 5/189 415/115 |
| 6,217,279 B1 | 4/2001 | Ai et al. | |
| 6,435,815 B2 * | 8/2002 | Harvey | F01D 5/145 415/115 |
| 6,663,346 B2 | 12/2003 | Munsell et al. | |
| 7,870,742 B2 | 1/2011 | Lee et al. | |
| 8,292,567 B2 | 10/2012 | Damle et al. | |
| 8,403,630 B2 | 3/2013 | Guemmer | |
| 8,568,090 B2 * | 10/2013 | Guo | F01D 25/32 415/169.1 |
| 9,334,754 B2 | 5/2016 | Khanin et al. | |
| 9,617,865 B2 * | 4/2017 | Zotz | F01D 17/16 |
| 10,451,084 B2 | 10/2019 | Subramanian et al. | |
| 2003/0133796 A1 | 7/2003 | Munsell et al. | |
| 2011/0180109 A1 | 7/2011 | Stillman et al. | |
| 2015/0010385 A1 | 1/2015 | Oyarbide et al. | |

FOREIGN PATENT DOCUMENTS

| | | |
|---|---|---|
| CN | 102562169 | 7/2012 |
| CN | 103527260 | 1/2014 |
| CN | 204024723 | 12/2014 |
| EP | 0267478 A2 | 5/1988 |
| EP | 2871323 A1 | 5/2015 |
| FR | 2999249 A1 | 6/2014 |
| JP | 3977780 | 9/2007 |
| WO | 2015092281 A1 | 6/2015 |

OTHER PUBLICATIONS

Canadian Patent Office, "Office action," issued in connection with Canadian Patent application No. 2,947,451, dated Oct. 26, 2017, 5 pages.

Chinese Patent Office, "Notification to go through formalities of registration," issued in connection with Chinese patent application No. 201611007388.3, dated Jan. 2, 2019, 5 pages.

United States Patent and Trademark Office, "Notice of Allowance," issued in connection with U.S. Appl. No. 14/941,995, dated Apr. 30, 2019, 14 pages.

United States Patent and Trademark Office, "Final Office action," issued in connection with U.S. Appl. No. 14/941,995, dated Jan. 30, 2019, 16 pages.

United States Patent and Trademark Office, "Non-Final Office action," issued in connection with U.S. Appl. No. 14/941,995, dated Sep. 5, 2018, 23 pages.

United States Patent and Trademark Office, "Advisory action," issued in connection with U.S. Appl. No. 14/941,995, dated Jun. 14, 2018, 3 pages.

United States Patent and Trademark Office, "Final Office action," issued in connection with U.S. Appl. No. 14/941,995, dated Feb. 27, 2018, 19 pages.

United States Patent and Trademark Office, "Non-Final Office action," issued in connection with U.S. Appl. No. 14/941,995, dated Oct. 6, 2017, 18 pages.

Extended European Search Report and Opinion issued in connection with corresponding EP Application No. 16196837.5 dated Mar. 17, 2017.

Chinese Patent Office, "Office action", issued on connection with CN patent application No. 201910193423.2, dated Mar. 24, 2021, 9 pages.

Chinese Patent Office, "Office action", issued on connection with CN patent application No. 201910193423.2, dated Oct. 12, 2021, 10 pages.

* cited by examiner

GAS TURBINE ENGINE WITH VANE HAVING A COOLING INLET

CROSS REFERENCE TO RELATED APPLICATION

The present application is a continuation of U.S. patent application Ser. No. 14/941,995, filed Nov. 16, 2015, and now allowed, which is incorporated herein by reference in its entirety.

BACKGROUND

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades. In the compressor stages, the blades are supported by posts protruding from the rotor while the vanes are mounted to stator disks. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine thrust, so cooling of certain engine components, such as the rotor post is necessary during operation. Typically, cooling is accomplished by ducting cooler air from the high and/or low pressure compressors to the engine components which require cooling.

In adjacent compressor stages, there is a tendency for the pressure across the adjacent stages to want to back flow through a seal with the vanes, leading to additional heating of the rotor post of an upstream compressor stage, which, under the certain thermal conditions, can lead to the temperature at the upstream rotor post exceeding its creep temperature resulting unwanted creeping of the rotor post. This is especially true for the most rearward or aft compressor stage, which is subject to the greatest temperature.

BRIEF DESCRIPTION

In one aspect the disclosure herein relates to a compressor for a gas turbine engine comprising an outer casing having circumferentially spaced vanes arranged in axially spaced groups of vanes, wherein each vane comprises a pressure side and a suction side and extends axially between a leading edge and a trailing edge; and a rotor located within the outer casing and having circumferentially spaced blades arranged in axially spaced groups of blades in alternating axially arrangement with the groups of vanes to define axially arranged pairs of vanes and blade, with each pair forming a compressor stage; the compressor stages having a circumferential seal extending between the rotor and the vanes to fluidly seal axially adjacent compressor stages; and a cooling air circuit passing through the vanes and having an elongated inlet located on one of the pressure side or suction side of the vanes and an outlet at the rotor upstream of a corresponding seal for the vanes.

In another aspect the disclosure herein relates to a method of cooling a multi-stage compressor of a gas turbine engine, the method comprising routing compressor air through a vane having a pressure side and a suction side and located in of one of the stages by receiving the compressor air through an elongated inlet located on one of the pressure side or suction side, passing the routed compressor air through the vane, and emitting the routed compressor into a space between the vane and a blade of at least one of an upstream stage and downstream stage of the compressor.

In yet another aspect the disclosure herein relates to a vane assembly for a compressor of a gas turbine engine comprising a vane comprising a pressure side and a suction side and having a leading edge and a trailing edge and a span extending from a root to a tip; a seal located on the root; and a cooling air circuit passing through the vane and having an elongated inlet located on one of the pressure side or suction side of the vane and an outlet at a rotor, with the outlet located at least one of upstream or downstream of the seal.

In yet another aspect the disclosure herein relates to a method of cooling a multi-stage compressor of a gas turbine engine, the method comprising reducing an operating air temperature in a space between a seal and a blade post of adjacent stages at least 50 degrees Fahrenheit as compared to without the cooling, by routing compressor air through a vane having a pressure side and a suction side and located in one of the stages by receiving the compressor air through an elongated inlet located on one of the pressure side or suction side, passing the routed compressor air through the vane, and emitting the routed compressor into the space, which is upstream of the vane.

DETAILED DESCRIPTION

The described embodiments of the present disclosure are directed to systems, methods, and other devices related to routing air flow in a turbine engine. For purposes of illustration, the present disclosure will be described with respect to an aircraft gas turbine engine. It will be understood, however, that the disclosure is not so limited and may have general applicability in non-aircraft applications, such as other mobile applications and non-mobile industrial, commercial, and residential applications.

Figure 1:
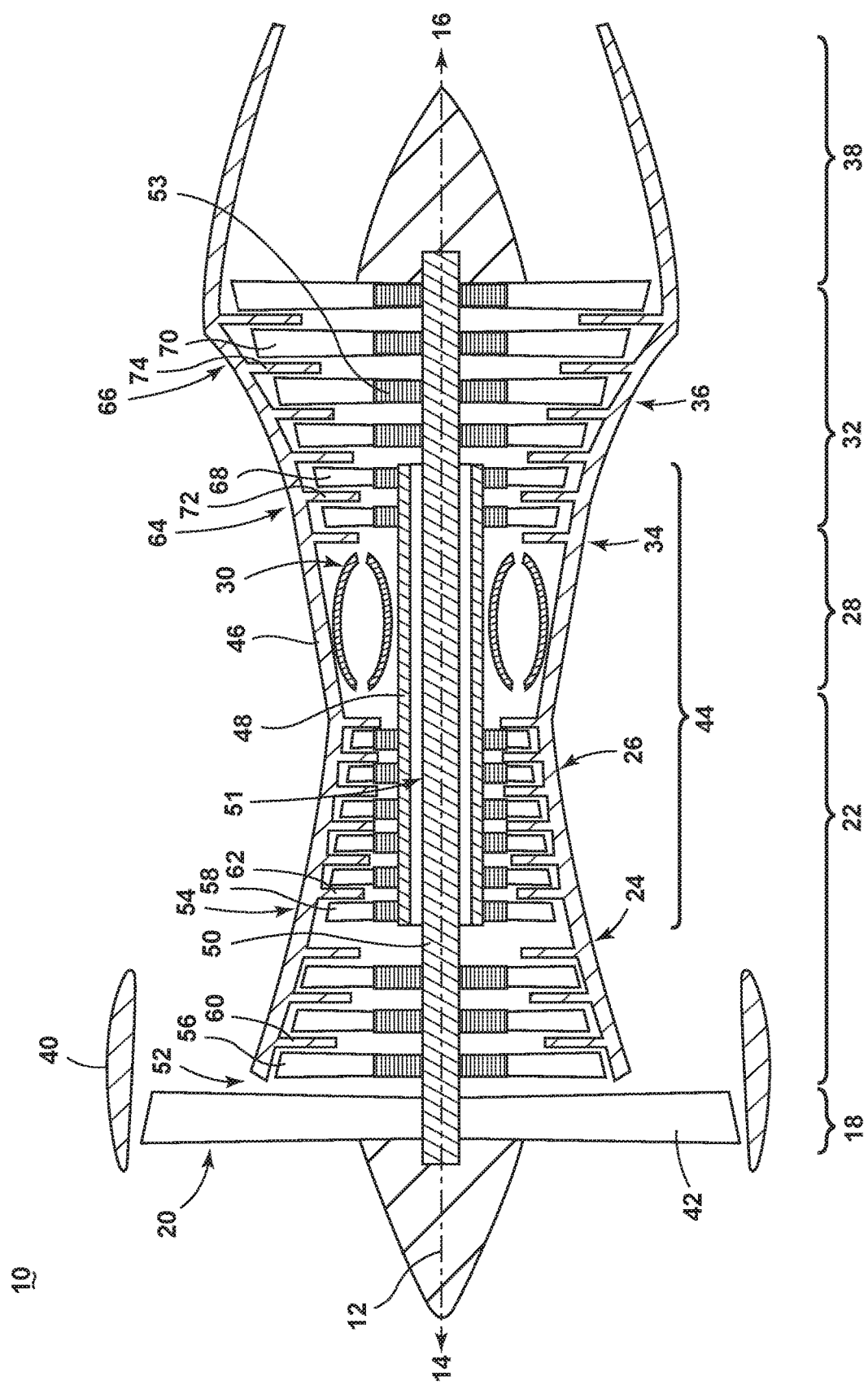
FIG. 1 is a schematic, sectional view of a gas turbine engine according to an embodiment of the disclosure.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by an outer casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
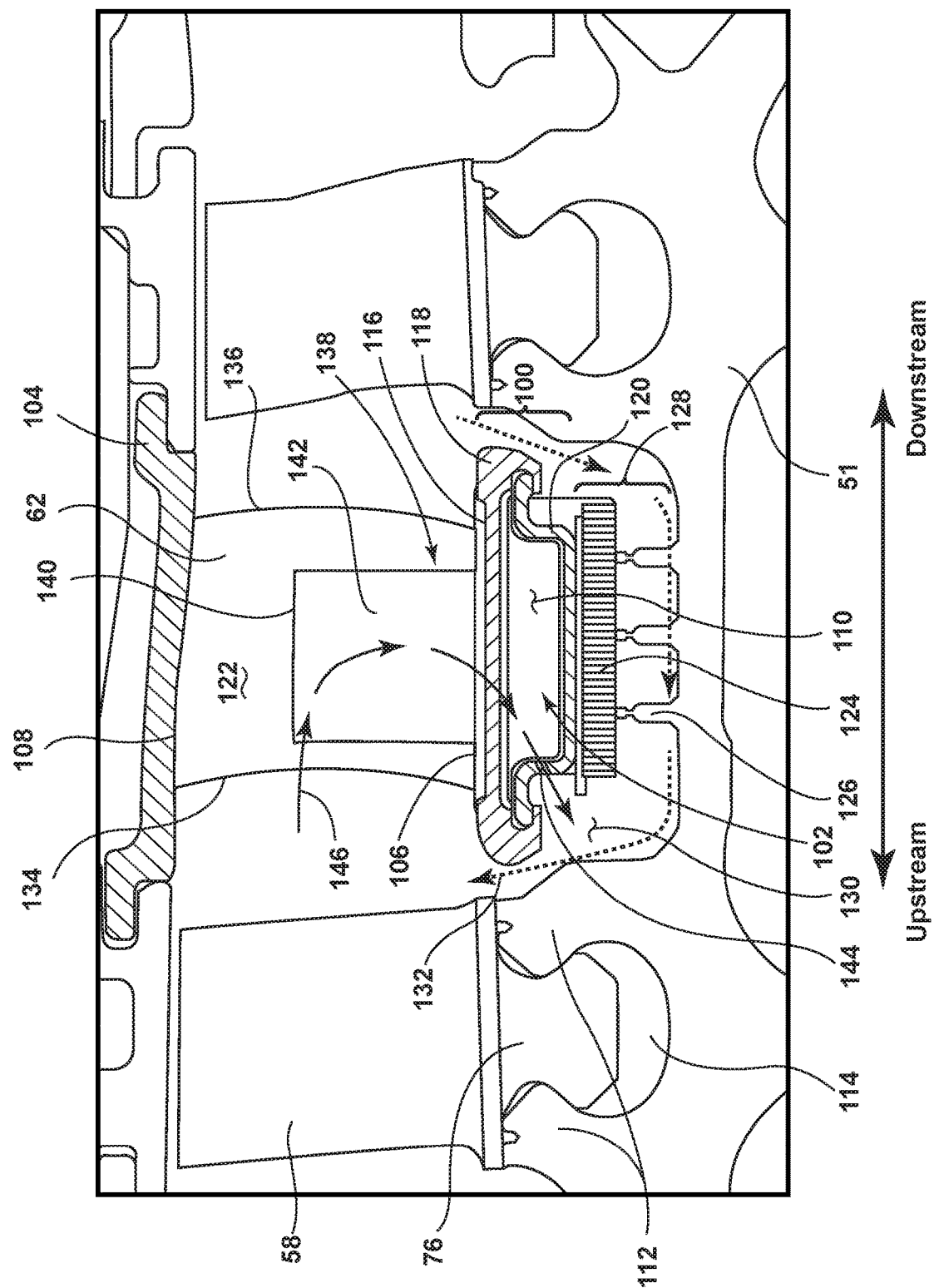
FIG. 2 is an enlarged, schematic cross-sectional partial view of a portion of the compressor in FIG. 1 and specifically including a vane between axially adjacent blades.

Referring to FIG. 2, a portion of the compressor section 22 is described in greater detail and which includes axially adjacent blades 58 from adjacent compressor stages 52, 54, with the intervening vane 62. The blades 58 are mounted to a post 112 extending from a disk 53 of the rotor 51. The blades 58 include a dovetail 76 that is received within a slot 114 in the post 112.

Figure 3:
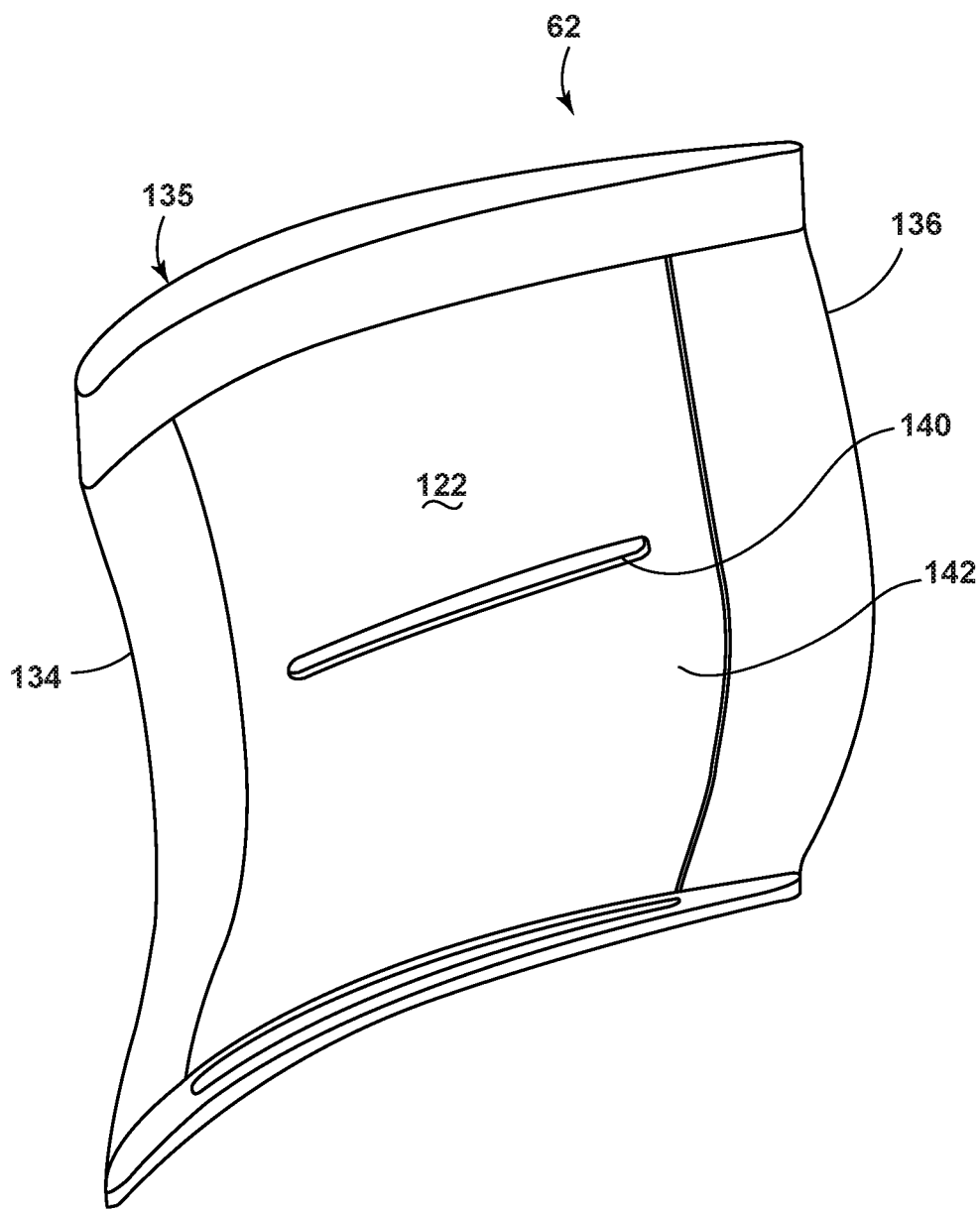
FIG. 3 is a perspective view of a vane suitable for use as the vane in FIGS. 1 and 2.

The vane 62 extend between inner and outer rings 100, 104. Each vane 62 spans radially from a root 106, at the inner ring 100, to a tip 108, at the outer ring 104. The vane 62 includes a leading edge 134 located on the upstream side of the vane 62 and a trailing edge 136 on the downstream side. Each vane further includes a pressure side 122 and a suction side 135 (FIG. 3). The vane 62 is mounted at the root 106 to the inner ring 100 and at the tip to the outer ring.

The inner ring 100 comprises an upper portion 118 and a lower portion 120 which together form a circumferential channel 102 about the rotor 51. The upper portion 118 provides a base 116 to which the root 106 of the vane 62 is mounted. The circumferential channel 102 provides an air conduit 110 circumferentially about the rotor 51.

A seal element, referred to as a seal 128 comprising a honeycomb element 124 and annular fingers 126 seals the inner ring 100 relative to the rotor 51. The honeycomb element 124 is mounted to the lower portion 120 of the inner ring 100 and the annular fingers 126 project from the rotor 51. The abutting of the fingers 126 with the honeycomb element 124 forms the seal 128 to seal adjacent compressor stages 52, 54 thereby keeping compressed air from a downstream compressor stage (relatively higher pressure) from backflowing to an upstream compressor stage (relatively lower pressure).

A seal cavity in the form of a space 130 is located upstream of the seal 128 of the vane 62, radially inward of the blade 58 and between the seal 128 and the post 112. As illustrated by the dashed arrow, under certain conditions backflow air 132 from a downstream compressor stage, which has higher temperatures due to being compressed and closer proximity to the combustor 30, can collect in the space 130 causing the air in the space 130 to increase in temperature. The compressor air flowing through the compressor stages 52,54 tends to flow over the space 130 and retards the removal of the backflow air 132, which leads to the generation of a hot spot in front of the post 112, and which leads to a heating of the post 112.

A cooling air circuit 138 is provided to direct the compressor air into the space 130 to effect a cooling of the space 130. The cooling air circuit 138 has an inlet 140 on the vane 62 which opens to a vane channel 142 within the vane 62. The vane channel 142 can be a hollow interior of the vane 62 or a dedicated channel formed in the vane, such as by placing an insert within the hollow interior. The vane channel 142 is fluidly connected to the circumferential channel 102 of the inner ring 100. An outlet 144 on the lower portion 120 of the inner ring 100 is fluidly coupled to the circumferential channel 102 and located at the upstream of the inner ring 100 such that the outlet 144 opens to the space 130. The outlet is not limited to upstream of the seal 128 and can be located downstream of the inner ring 100.

The inlet 140 to the cooling air circuit 138 is best seen in FIG. 3, which is a perspective view of an exemplary 3-D vane 62. The inlet 140 is elongated in the flow direction and extends generally between the leading edge 134 to the trailing edge 136 in a generally axial direction. The inlet 140 is located on the pressure side 122 of the vane 62, which will aid in the natural flowing of the compressor air into the inlet 140. However, while not as ideal, the inlet 140 can be located on the suction side 135 of the vane 62. While the inlet 140 is illustrated as a simple opening, it can have a complex geometry, especially one that does not follow the contour of the vane 62. A scoop or similar structure can be provided for the inlet 140 to aid in directing the compressor air into the inlet 140, which would be especially useful if the inlet 140 is located on the suction side 135.

While the inlet 140 can be located anywhere along the span of the vane 62, it is most advantageous for the inlet 140 to be located where the coolest air is found. For most vane geometries, the coolest air is located on the pressure side 122 of the vane 62, and at the mid-span area of the vane 62. The routed air follows a pathway 146 and is deposited in the space 130. The pathway 146 begins on the leading edge 134 of the vane 62 and passes through the cooling air circuit 138 into the seal cavity space 130. The cooling air circuit 138 is provided in at least some of the vanes 62 in the most downstream compressor stage 54 of the gas turbine engine 10.

Figure 4:
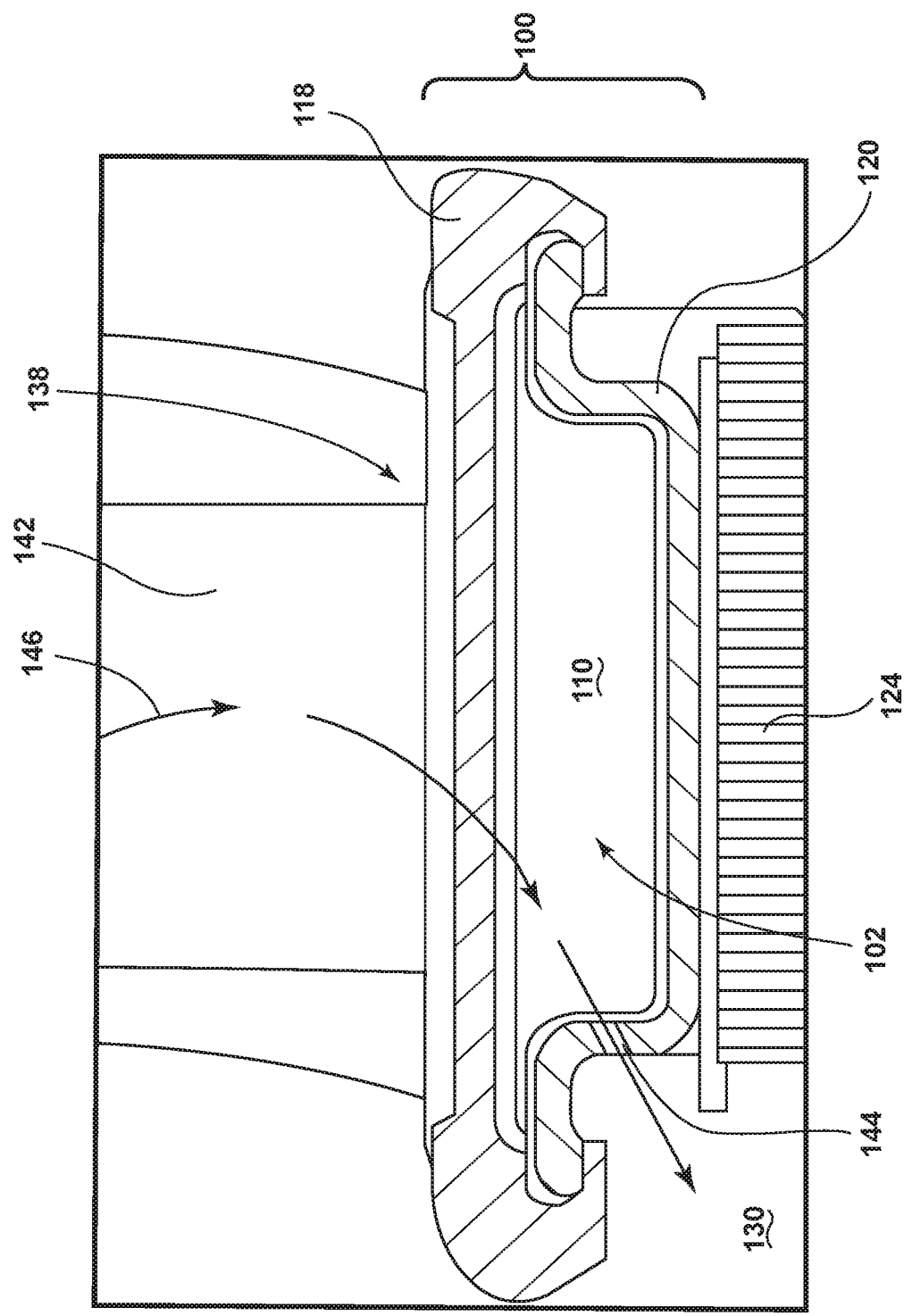
FIG. 4 is an enlarged, schematic sectional view of a lower portion of the vane of FIGS. 1 and 2.

The outlet 144 to the cooling air circuit 138 is best seen in FIG. 4, which is an enlarged schematic sectional view of the lower portion of the vane 62 taken from FIG. 2. While only one outlet 144 is shown, there can be multiple outlets for each blade post 112. The outlets 144 are located such the air emitted from the outlet flows into the space 130 and can impinge on the post 112.

It should be noted that while only one blade post 112 and one vane 62 are described, that the description applies to all blade posts 112 and vanes 62 that are spaced circumferentially around the engine centerline 12. It should also be noted that while the blade posts 112 and vanes 62 are described for the compressor, that cooling air circuit 138 has similar applicability in other areas of the engine 10.

In operation, as shown in FIG. 2, backflow air 132 can develop between adjacent compressor stages, when the higher pressure air of the downstream compressor passes upstream through the circumferential seal 128. In essence, the higher pressure air in the downstream stage, which is higher in temperature than the upstream stage, is suctioned by the pressure differential toward the upstream stage. The additional heat from the downstream stage heats the blade post 112. Under the right conditions, the blade post can be heated to the point where it exceeds the creep temperature and the blade post creeps radially. If the creep is greater enough, the blade 58 can rub the casing.

Cooling air from the cooling air circuit 138 is provided from the normal flow through the compressor stage along pathway 146 to the space 130 to cool the blade post 112. The cooling air supplied through the pathway 146 drops the air temperature of the space 130 below a creep temperature of the blade post 112. The cooling air circuit 138 reduces the air temperature of the space 130 between the seal 128 and the blade post 112 by at least 50 degrees Fahrenheit as compared to an air temperature without cooling by routing compressor air through a cooling air circuit 138.

Figure 5:
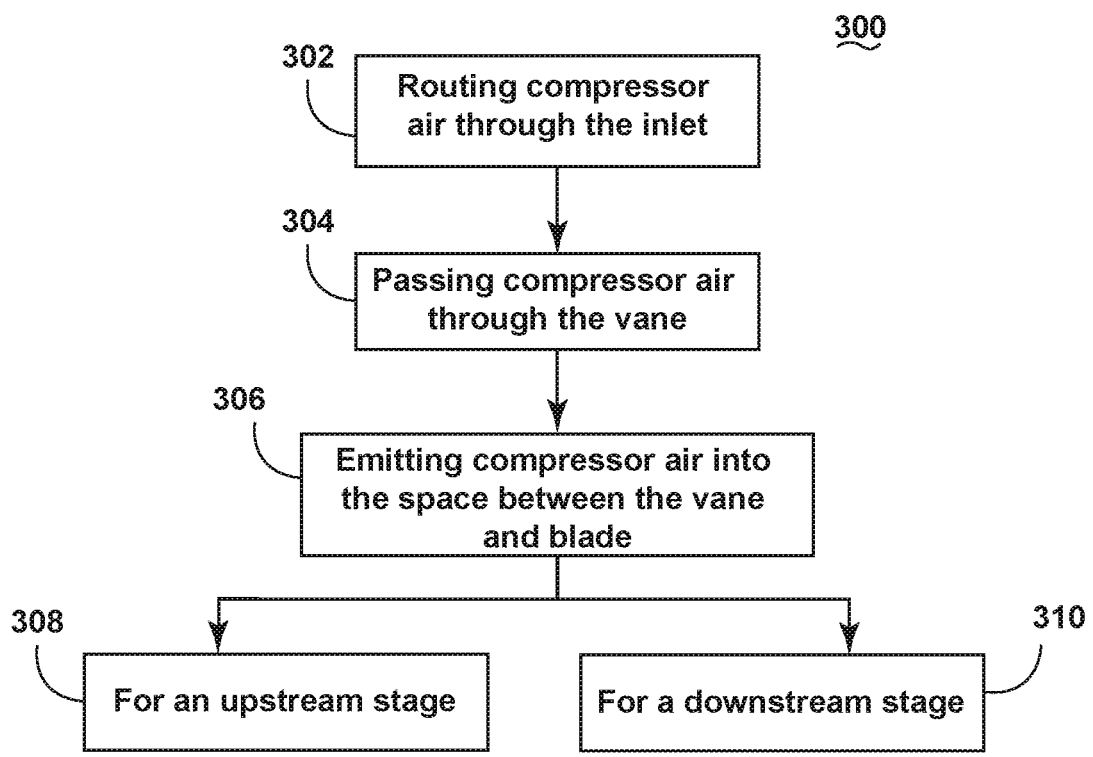
FIG. 5 is a flow chart illustrating a method for reducing the operating air temperature in a stage.

FIG. 5 illustrates a method 300 of implementing the apparatus described above for cooling a multi-stage compressor of a gas turbine engine. The method 300 includes routing 302 compressor air which can follow the pathway 146 of FIG. 2 through the inlet 140 in the vane 62 of one of the compressor stages 52, 54 in which the routed compressor air is drawn from a mid-span area of the vane 62 on the pressure side 122 of the vane 62. The method further comprises passing 304 the routed compressor air through the vane 62, and finally emitting 306 the routed compressor into a space 130 between the vane 62 and a blade 58 of at least one of an upstream stage 308 and downstream stage 310 of the compressor 24, 26. This method 300 reduces an operating air temperature in the space 130 between the seal 128 and the blade post 112 of adjacent stages to below the creep temperature of the blade post 112. This method reduces the air temperature at least 50 degrees Fahrenheit as compared to without the cooling.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compressor for a gas turbine engine, the compressor comprising:
   an outer casing;
   a set of inner and outer rings disposed within the outer casing and having circumferentially spaced vanes arranged in axially spaced groups of vanes, wherein each vane comprises a pressure side and a suction side and extends axially between a leading edge and a trailing edge; and
   a rotor located within the outer casing and having circumferentially spaced blades arranged in axially spaced groups of blades in alternating axially arrangement with the groups of vanes to define axially arranged pairs of vanes and blades, with each pair forming a compressor stage;
   the compressor stages having a circumferential seal extending between the rotor and the vanes to fluidly seal axially adjacent compressor stages; and
   a cooling air circuit passing through the vanes and having an elongated inlet located on one of the pressure side or suction side of the vanes and an outlet at the rotor upstream of a corresponding seal for the vanes,
   wherein the inlet is located along a span of the respective vane in an area of coolest air flow over the vane.

2. The compressor of claim 1, wherein the inlet is located in a mid-span area of the vane.

3. The compressor of claim 2, wherein the inlet is elongated in a flow direction.

4. The compressor of claim 3, wherein the inlet is located on the pressure side of the vane.

5. The compressor of claim 4, wherein the inlet comprises a scoop.

6. The compressor of claim 1, wherein the cooling air circuit is provided in at least some of the vanes in the most downstream compressor stage.

7. The compressor of claim 1, further comprising a first inner ring of the set of inner rings, the first inner ring located within the casing and supporting the vanes of the respective compressor stage at a root of the corresponding vane and the first inner ring defines a circumferential channel forming part of the cooling air circuit.

8. The compressor of claim 7, wherein the outlet of the cooling air circuit is formed in the ring.

9. The compressor of claim 8, wherein the seal comprises a honeycomb element mounted to the ring and fingers extending from the rotor and abutting the honeycomb element.

10. The compressor of claim 1, wherein the rotor comprises posts and the outlet emits the cooling air toward the post upstream of the vane.

11. The compressor of claim 10, wherein a space between the posts of one compressor stage and seal for a downstream compressor stage define a seal cavity and the outlet emits cooling air into the seal cavity.

12. A method of cooling a multi-stage compressor of a gas turbine engine, the method comprising routing compressor air through a vane having a pressure side and a suction side and located in of one of the stages by receiving the compressor air through an elongated inlet located on one of the pressure side or suction side, passing the routed compressor air through the vane, and emitting the routed compressor into a space between the vane and a blade of at least one of an upstream stage and downstream stage of the compressor, wherein the inlet is located along a span of the vane in an area of coolest air flow over the vane.

13. The method of claim 12, wherein the space is upstream of a seal for the vane.

14. The method of claim 13, wherein the space is radially inward of the blade.

15. The method of claim 14, wherein the space is between the seal and a post mounting the blade.

16. The method of claim 12, wherein the routed compressor air is drawn from a mid-span area of the vane.

17. The method of claim 12, wherein the routed compressor air is drawn from the pressure side of the vane.

18. A vane assembly for a compressor of a gas turbine engine comprising:
a vane comprising a pressure side and a suction side and having a leading edge and a trailing edge and a span extending from a root to a tip;
a seal located on the root; and
a cooling air circuit passing through the vane and having an elongated inlet located on one of the pressure side or suction side of the vane and an outlet at a rotor, with the outlet located at least one of upstream or downstream of the seal,
wherein the inlet is located along a span of the vane in an area of coolest air flow over the vane.

19. The vane assembly of claim 18 wherein the inlet is located on one of a mid-span area of the vane or the pressure side of the vane.

* * * * *